United States Patent [19]

Burgess

[11] 4,061,972
[45] Dec. 6, 1977

[54] SHORT RANGE INDUCTION FIELD COMMUNICATION SYSTEM

[76] Inventor: Victor Robert Burgess, 35 Koonawarra Avenue, Lindfield, New South Wales 2070, Australia

[21] Appl. No.: 734,381

[22] Filed: Oct. 20, 1976

Related U.S. Application Data

[63] Continuation-in-part of Ser. No. 529,091, Dec. 3, 1974.

[51] Int. Cl.² .............................................. H04B 1/38
[52] U.S. Cl. ........................................ 325/16; 325/22; 325/57; 325/144; 325/187; 179/82
[58] Field of Search ................ 179/82, 1 VC; 325/16, 325/22, 57, 58, 144, 187

[56] References Cited

U.S. PATENT DOCUMENTS

| | | | |
|---|---|---|---|
| 2,312,824 | 3/1943 | Kroger | 179/82 |
| 2,515,663 | 7/1950 | O'Brien | 179/82 |
| 2,774,873 | 12/1956 | Rieke | 325/58 |
| 3,043,916 | 7/1962 | Sneath | 179/82 |
| 3,191,066 | 6/1965 | Staudenmayer | 325/22 |
| 3,469,192 | 9/1969 | Tomono | 325/187 |
| 3,808,539 | 8/1974 | Martin | 324/144 |
| 3,814,856 | 6/1974 | Dugan | 179/1 VC |

Primary Examiner—Benedict V. Safourek
Assistant Examiner—Michael A. Masinick
Attorney, Agent, or Firm—Owen, Wickersham & Erickson

[57] ABSTRACT

A short range communication or signalling system uses induction field FM or PCM capture effect properties to transfer information to receivers located outside the aerial configuration of the transmitter. When used as a deaf aid, the receiver is equipped with a conventional hearing aid for use when the transmitter is silent. Switching of the transmitter and receiver from one mode to another is achieved manually or using a VOX system. Adjustable sensors of field strength may be provided in the receiver (a) to inhibit transmission when a nearby transmitter is already operating and (b) to reduce the effective range of the receiver.

10 Claims, 3 Drawing Figures

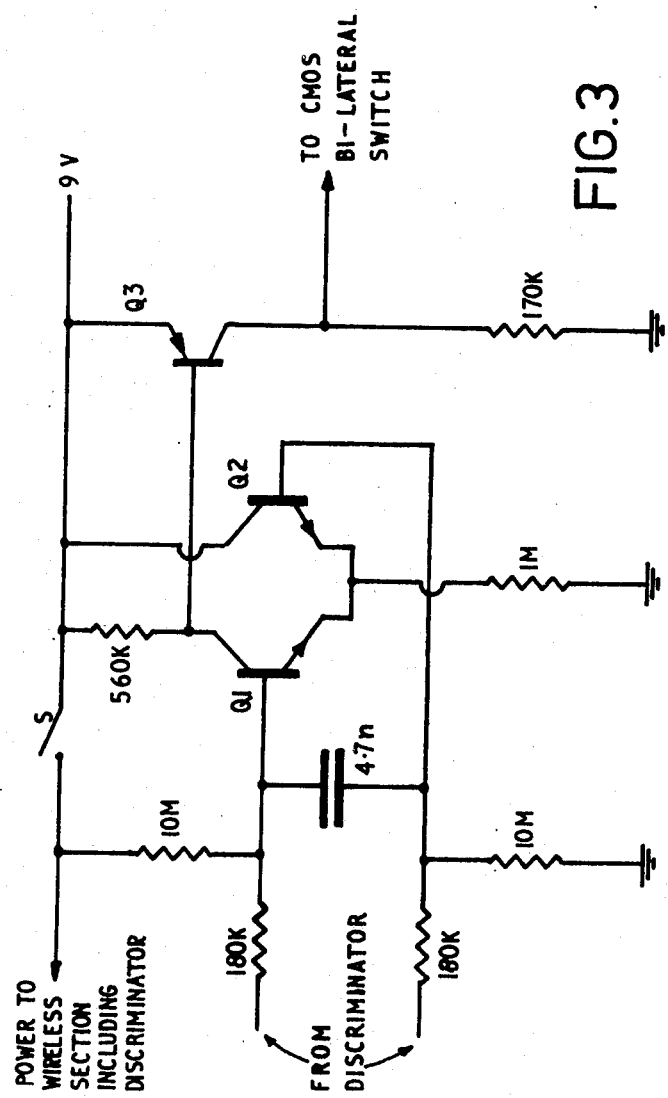

SHORT RANGE INDUCTION FIELD COMMUNICATION SYSTEM

This application is a continuation-in-part of application Ser. No. 529,091 filed Dec. 3, 1974.

The present invention concerns communication systems for the transmission and reception of audio information over distances normally close enough for direct speech but in circumstances where ordinary speech fails to provide a satisfactory communication link. However, as will be seen, it has other applications, for example, in signalling.

Basically, the present invention provides short range wireless communication links which are established by the proximity of the transmitter and the receiver to each other, using the established capture and interference rejection properties of frequency modulation (FM) together with the rapid fall off in field intensity with distance from transmitter if the frequency and distance are selected so that transmission takes place via the induction field and the receiver is external to the transmitting aerial configuration.

Two situations in which the present invention is particularly advantageous are the high environmental noise areas, such as the factory floors of industrial manufacturing and assembly works, and the low level reception of the partially deaf. In these situations, the present invention is used to select audio communication links by proximity as do individuals employing direct speech.

In the first area of high environmental noise, such as occurs in industry in proximity to machinery, it is desirable to wear some form of ear protection to avoid damage to the sense of hearing. This protection lowers the sound level applied to the ears and generally impedes the ability of workers to communicate with each other. Indeed, in many cases those workers at risk have already incurred a hearing loss and find it impossible to communicate while wearing ear protection. In this situation, the present invention takes the form of portable mobile transceivers equipped with noise excluding headphones and noise cancelling or throat microphones.

In the case of persons who are partially deaf there is usually a loss of perception as well as sensitivity and the problem of interpreting speech in the presence of ambient noise cannot be solved satisfactorily by amplifying all sound to a higher level, as is done by the conventional hearing aid. What is needed to communicate speech to the partially deaf listener is an amplified signal having a substantially improved signal-to-noise ratio. This can best be obtained by picking up the speech in a microphone located near the speaker's lips. The present invention in this situation usually comprises an hearing aid containing an induction field FM receiver used together with an induction field transmitter which can be held, carried by or worn by the speaker.

In both of these situations, the system of the present invention has two advantages. Firstly, a single frequency allocation is all that is normally required, thereby contributing to the conservation of spectrum space. Secondly, the establishment of a communication link merely involves the same approach as in ordinary conversation and does not require tuning-in or switching of frequencies, thereby avoiding confusion and allowing simplification and miniaturization of the equipment.

Previous work in the area of FM communication has provided an induction loop which can surround the entire factory area or classroom, with the signal from the loop being transmitted to all FM receivers within its influence. Also a wireless microphone transmitting into a loop receiving aerial has been reported (by G. F. Montgomery in the January 3rd, 1958 issue of "Electronics" (Engineering edition), pages 54–55). More recent developments are illustrated in the Data brochure for the Telex Wireless Trainer Model TWT-2 (published November, 1972) and the paper by N. D. Matkin and W. O. Olsen (February, 1973 issue of "American Annals of the Deaf", pages 25–30) entitled "An Investigation of Radio Frequency Auditory Training Units".

All the published short range FM communication systems for this sort of application, however, refer only to (a) fixed transmitter to fixed receiver, (b) fixed transmitter to mobile receiver arrangements, and (c) mobile transmitter to fixed receiver arrangements, with the receiver aerial located within or very nearly within the loop aerial configuration of the transmitter, or vice-versa. No mobile transmitter to mobile receiver arrangement, which is required in schools and large factories, has been proposed previously.

It is an objective of the present invention to satisfy this requirement by providing a short range mobile-to-mobile transmitter and receiver arrangement.

According to the present invention, an induction field communication system which utilizes a modulation format enabling selection between similar electromagnetic signals by capture effect comprises:

a. transmitting means for transmitting signals in said format and including an induction field generating aerial and microphone circuit, said transmitting means being equipped with an audio automatic gain control in its microphone circuit, said transmitting means having first and second transmitting modes, b. a signal receiver for receiving signals in said format and having an induction field receiving aerial, said receiver being sufficiently within the induction field directly generated by said field generating aerial to cause signals from said transmitting means to capture said receiver to the exclusion of other similar signals received by said receiving aerial, and c. control means for switching the transmitting means from said first transmitting mode to said second transmitting mode, said second transmitting mode being effective to switch the receiver to a different receiving mode.

Any suitable transmitter or receiver can be used; the choice of transmitter and receiver will depend generally on the frequency at which the system is to operate. If the transmitter or receiver has an aerial consisting of a winding on a high permeability core, the core will usually be a ferrite rod; a winding includes the case of a single turn, or even a half turn.

In two-way systems, when each person involved will be provided with a transceiver, selection of the person with whom contact is to be established can be made by approaching that person until the signal from the transmitter is greater than any other received by that person, or until the signal from the transmitter produces a field strength greater than that required to activate the receiver.

Using realistic design parameters the present inventor has found that interference from unwanted transmitters of equal transmission power can be made negligible provided that the wanted transmitter is within half the distance from the receiver of any unwanted transmitters. If both the transmitters and receivers are mobile, the establishment of any communication link may be initiated by movement of either a transmitter or a receiver or both. All transmitters and receivers may use the same carrier frequency, but if it is required to divide the transmitters and receivers into a number of sets between which communication cannot take place, then each set may be assigned to a different carrier frequency, or the sets must be separated so that no transmitter in one set establishes the threshold field strength of a receiver in another set.

While frequency modulation is the preferred modulation system it should be recognized that other modulation systems exhibit capture and interference suppression characteristics and can in principle be used.

The preferred induction field is that obtained from a magnetic dipole. The induction field is taken to be that field, the intensity of which decays approximately in inverse proportion to the cube of the distance from the dipole up to a distance equal to the fraction $\frac{1}{2}\pi$ of the wavelength approprite to the carrier frequency being used. Beyond this distance the field intensity decays approximately in inverse proportion to the distance and is in essence a radio wave. It should be recognized that an electric dipole field could in principle be used, but it would be seriously disturbed by conducting objects such as the human body. Quadrupole and even higher order multipole fields may be used to provide a greater rate of decay with distance together with directional properties thus providing enhanced discrimination against unwanted transmitters. However, due to the greater rate of decay of the field, the attainable range is reduced.

In one example of the use of the present invention, a system having three transmitters and one receiver was constructed, operating on a carrier frequency of 3.6 MHz. Substantially vertical ferrite rods 17 cm long and 1 cm diameter were used for both transmission and reception, although ferrite rods of 5 cm and 10 cm length and 1 cm diameter have subsequently been substituted in the receiver. The transmitter was designed to correspond to an optimized design in which the output stage drew 20 mW of D.C. power. The receiver had a RF6 and pass of 26 KHz and was equipped with conventional high impedance headphones limiting the audio output to the range 300 Hz to 3000 Hz. The deviation of the carrier frequency was 10 KHz, so the system can be regarded as medium bandwidth FM. Pre-emphasis of audio frequencies above 1 KHz was used in the transmitter with a corresponding de-emphasis in the receiver.

In another system automatic gain control was incorported. The AGC was of the peak limiter type, with 12 KHz deviation using a magnetic microphone mounted on a headset. It will be clear to persons skilled in this art that an electret microphone is preferred and that, when communicating with partially deaf people, the AGC should not be of the type in which the signal is pre-emphasized, chopped to a square wave, then de-emphasized.

To further explain the present invention, an embodiment in the form of a communication system for partially deaf persons will now be described with reference to the accompanying drawings, in which:

FIG. 3 illustrates one receiver circuit which may be used to switch the receiver to a sound sensitivity (hearing aid) mode of operation.

Figure 1:
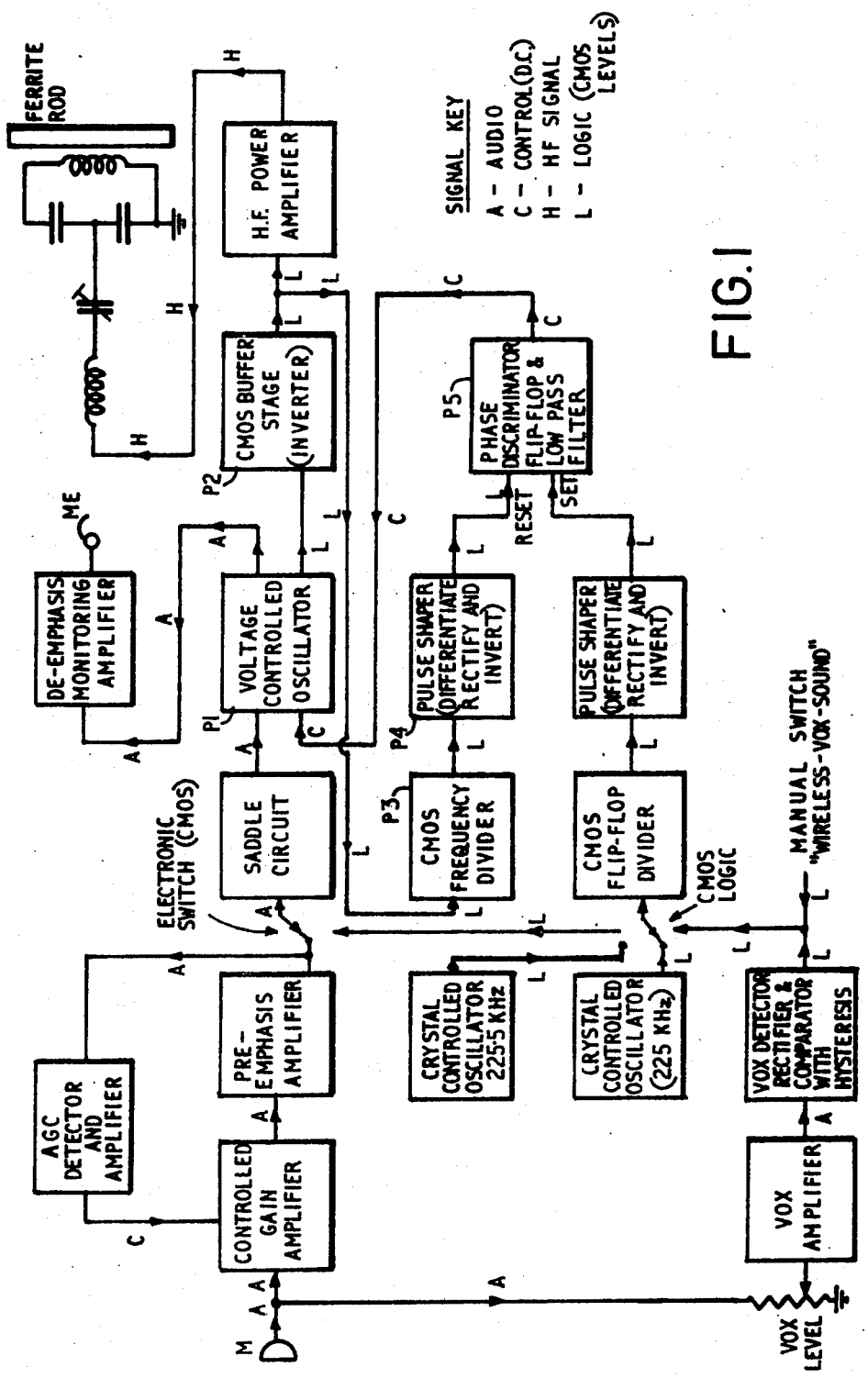
FIG. 1 is a block diagram of a transmitter incorporating AGC and a VOX system.

The transmitter of FIG. 1 is an FM transmitter (having a carrier frequency of 3.6 MHz in the experimental systems used by the present inventor), the deviation of which is limited by an audio AGC in the microphone amplifier. Typically this is a peak limiter circuit, i.e., the gain is reduced when the signal fed to the modulator reaches the level corresponding to the maximum deviation to be allowed, then the gain is allowed to increase slowly. In the experimental transmitters, the gain has been controlled by a junction field effect transistor (FET) acting as a voltage controlled resistor in a feedback mode. The "attack" time is less than 1 millisecond and "recovery" is about 20 dB per second. There is no variation in the peak output over about 80 dB input variation and the same volume is obtained in the receiver whether the operator whispers or shouts into microphone M. In normal speech the AGC has been found to be quite unobtrusive in its action and does not appear to affect intelligibility. It may be noted that the controlled signal voltage drops as the battery voltage drops, but the sensitivity of the modulator increases as the battery voltage drops, so the two effects cancel and the deviation remains substantially the same for battery voltages from 6 volts to 10 volts.

The phase locked loop (blocks P1, P2, P3, P4, and P5 of FIG. 1) is based on the approach of Byrne ("Bell System Technical Journal", Vol. 41, Pt. 1, page 559, 1962). The phase locked loop is necessary because when two or more transmitters are used in a system, their carrier frequencies must be within a few cycles of the same frequency for beat notes to be avoided, and it is necessary to lock the average frequency of the transmitter to a crystal or other stable reference while at the same time frequency modulating it.

The voice operated switch (VOX) system has been incorporated into the transmitter to allow "hands off" operation of the transmitter. The VOX system is one in which the microphone output is used to trigger a wireless sensitivity sould sensitivity switch in the hearing aid. To avoid the possibility of ambient noise triggering the VOX, a second microphone exposed to ambient noise may be used to raise the threshold of the VOX in response to the ambient noise level. Alternatively, a noise cancelling microphone in front of the lips may be used, so that background noise is not picked up unnecessarily. In the transmitter illustrated in FIG. 1, the VOX detector is an amplifier peaked in response to a frequency of about 600 Hz (the region of maximum energy in speech). The output of this amplifier is rectified and (using the comparator with hysteresis due to positive feedback) converted into a logic signal which is used to switch off the modulation and (in the particular embodiment illustrated) cause the carrier frequency to shift. This shift in carrier frequency is interpreted by the receiver to cause it to switch to a hearing aid (i.e., amplifying of local acoustic level) mode only. (It is generally desirable to incorporate monitoring earphone ME and associated circuitry or a visual display such as a liquid crystal to enable operation of the transmitter to be checked and the VOX level to be set.)

When the frequency of a transmitter is shifted, a beat note is produced in the electrical output of any receiver nearby which is receiving a transmitter the frequency of which is not shifted. Hence the frequency shift must be large enough for the beat note produced to be ultrasonic or outside the pass band of the output transducer of the receivers. Since the output transducers of hearing aids are restricted in their frequency range, a frequency shift of 8KHz has been found to be suitable.

One way in which the receiver can switch in this manner is illustrated in FIG. 3. In this circuit, when the transmitter is operating on the un-switched carrier frequency, the bias via the 10M resistors turns transistor Q1 on, thus turning transistor Q3 on and giving an output to the CMOS bi-lateral switch which connects the audio from the wireless receiver to the output amplifier. If there is a sustained carrier shift of more than 4KHz, the discriminator output overcomes the bias and transistor Q2 turns on, transistor Q1 turns off, transistor Q3 turns off and zero voltage is fed to the CMOS bi-lateral switch, connecting the receiver microphone to the output amplifier and causing the receiver to act as an ordinary hearing aid. Incidentally, if switch S is opened to remove power from the wireless section of the receiver, neither transistor Q1 nor transistor Q2 can turn on and the receiver can only function as a hearing aid.

It will be clear to those skilled in this art that the circuitry of FIG. 3 is relatively simple, and that other circuits can be used which perform the same operations or achieve the same result by a different technique (e.g., receiving a transmitted AM signal or high frequency FM tone, or the absence of the carrier or sub-carrier.

Another feature of the transmitter of FIG. 1 is the ability of the operator to manually switch the receiver to the acoustic reception mode. This is effected by manually causing the transmitter to be switched to a shifted transmission frequency (or perform the alternative technique as indicated in the last preceding paragraph). This enables the listener to hear his or her own voice and other environmental sounds, rather than have silence, or capture the transmission from a more remote transmitter, in the event that the operator wishes to discontinue talking for more than a short period of time.

Figure 2:
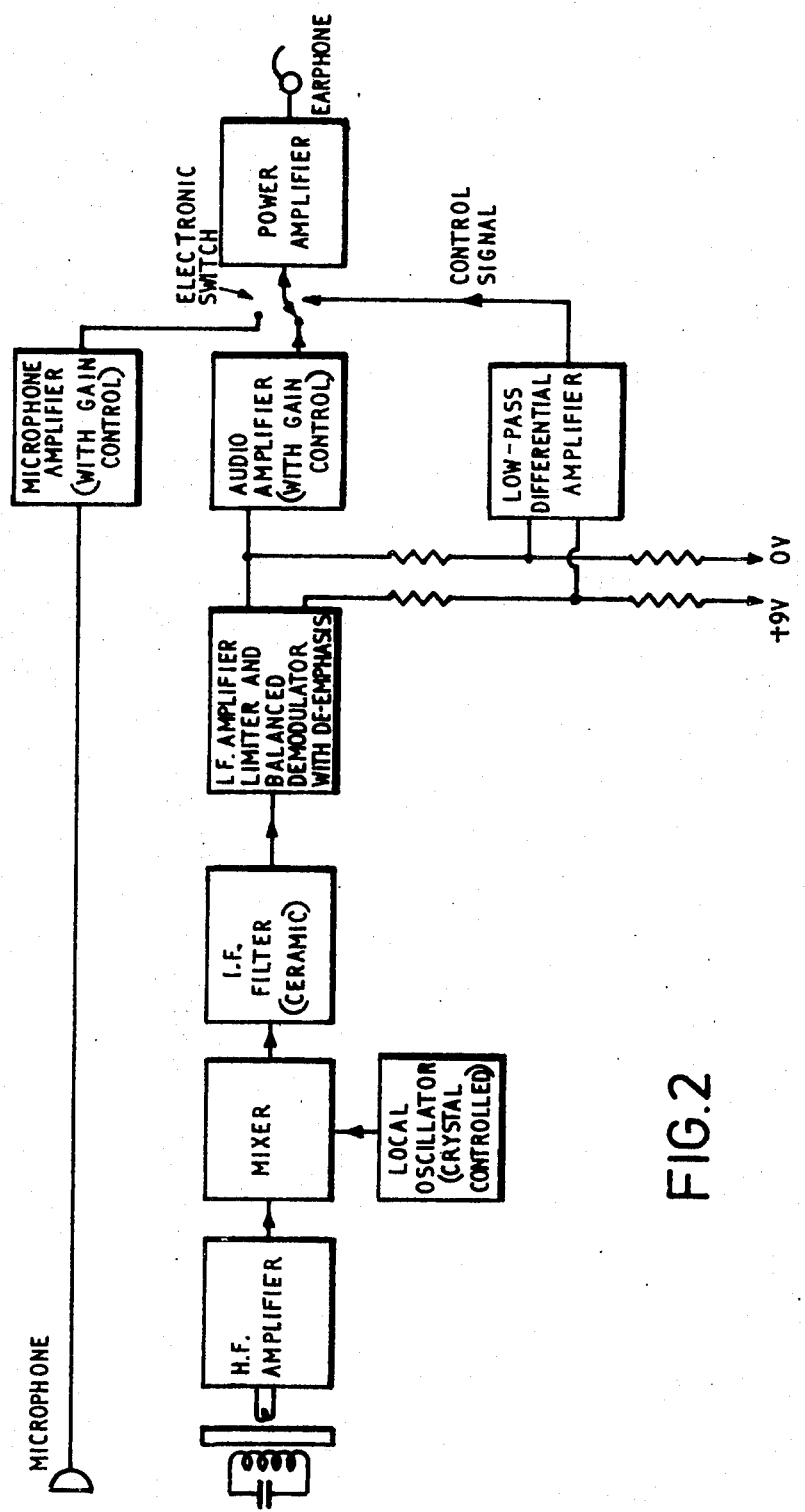
FIG. 2 is a block diagram of a receiver which may be used with a transmitter of the type illustrated in FIG. 1.

The full receiver used with the experimental systems is illustrated in FIG. 2. Its operation should be clear to those skilled in this art from a study of the block diagram. Additional features that may be incorporated include multichannel operation (for use in, say, the school situation in adjacent classrooms); provision of two audio amplifiers to provide appropriate amplification for each ear of the listener; provision of audio AGC; the use of two post-aural receivers having separate microphones if required and having different amplification if necessary to compensate for different hearing losses in the ears of the listener; and means to cause the receiver to revert to silence or acoustic sensitivity if an inadequate level of wireless signal is received or if operating in a zone of distortion between two or more transmitters (e.g., by detecting the AM component due to the beats produced when transmitters are received at comparable levels).

The established characteristic of FM systems of medium of wide bandwidth is that the received signal to noise ratio deteriorates at first slowly and then abruptly as the signal strength is reduced. The point of abrupt change is known as the improvement threshold and occurs when the noise in the I.F. channel, rather than the signal, is clipped by the limiter. It has been found that out-of-doors thresholding occurred in the first experimental system when the separation between the transmitter and the receiver reached 15 meters. In a second system, it was 20 meters because higher transmitter power was used. With both systems, as the separation was increased, the quality of the reception deteriorated from excellent to unusable in about 1 meter. The range of the systems was therefore 15 and 20 meters, respectively, using substantially vertical ferrite rod transmitting and receiving aerials.

Inside the laboratory, both systems showed little evidence of noise pick-up from electrical equipment. The ranges were increased, probably due to the signal being carried along wires, pipes and metal structural elements. The relationship between signal level and distance was found to follow closely the expected inverse cube law up to a distance of 6 meters, despite the proximity of large metal objects.

By using two transmitters, it was found that the signal from either transmitter could be captured by proximity. As the receiver was moved from the proximity of one transmitter to that of the other, the change-over of reception is found to take place in a zone having a width of about 2% of the distance between the two transmitters. In this zone, distortion occurred and neither signal was intelligible, while outside it a very slight and unintelligible breakthrough from the more distant transmitter was evident. However, a profoundly deaf person using the system could not experience the breakthrough. The slight breakthrough became unnoticeable to a person with normal hearing once the ratio of the distances of the two transmitters became 2:1 and became totally undetectable when the ratio of the distances became 3.5:1.

When three transmitters were used, the situation became a little more complex and there was a small area where the three carriers were of approximately equal amplitude; throughout this area the sound was unintelligible and objectionably distorted to a person of normal hearing. The signal of any one of the three transmitters could be captured by proximity, however, as in the two transmitter case.

In the case of a system incorporating transceivers—e.g., for use in the noisy industrial environment—the VOX system should be arranged to effect switching of the transceiver from the transmit to the receive mode when the operator is not speaking, and to a transmit mode again when the operator resumes conversation.

In a discussion group situation —in a noisy environment or where a group of partially deaf persons are conversing— it has become clear that a useful feature in the communication system would be the ability of restrict the number of simultaneously operable transmitters. For example, when the present invention is being used to encourage oral peer interaction of profoundly deaf children, the poor articulation and weak voices of the children make it even more necessary for them to employ telephony to hear each other than to hear their teachers. In principle, it would be possible for the teacher to "conduct" the group to avoid more than one transmitter being switched on, but if several transmitters did get switched on simultaneously, the teacher would need to use sign language to sort things out and in an oral situation this would be undesirable.

To provide an automatic interlock, each receiver is provided with means to generate an inhibition signal to prevent its associated transmitter becoming energized while any other transmitter in the group is transmitting. A pupil is normally able to initiate a transmission manually with a switch or vocally with the VOX, but with the automatic interlock, any attempt to initiate a transmission while another is in progress is automatically inhibited. Thus each pupil has to wait until a current transmission finishes before being able to initiate a transmission.

The teacher's unit would need to be wired a little differently to give the teacher priority. This can be achieved by allowing the teacher to switch to "transmit" before a pupil stops transmitting, the teacher's transmitter adopting a "wait" mode until the pupil stops talking, then automatically and immediately commencing its transmission and capturing the group.

The inhibition of the transmitter when another transmitter is already operating can be achieved simply by sensing the presence of the existing signal—normally at a level above a required "threshold" value—deriving an inhibition signal, and transferring that signal to a circuit providing inhibition in the transmitter.

Another advantageous feature of systems incorporating the present invention is that the very predictable relationship between field strength and distance enables the receiver to be controlled so that it only responds to received wireless transmissions having a strength above an adjustable threshold value. (In practice, if the carrier frequency is moved up from about 3-6 MHz into the VHF region—say, 30-40 MHz — reflections of the transmitted signals can produce standing waves, which disturb the normally monotonic relationship between field strength and distance from the transmitter. Care should be taken when controlling the reception range if such carrier frequencies are used.) In the case of a partially deaf user of the equipment, the hearing aid responds to environmental sould unless a given field strength is exceeded. In a classroom situation, the receiver could be provided with a calibrated control to adjust its range, relative to the teacher's transmission (or that of fellow-students) so that the teacher would only be heard by wireless transmission when close to the student. The value of adjustable range control in communication systems has been outlined by the present inventor in his paper "Wireless Hearing Aids" to be published in the "Australian Journal of Humam Communication Disorders", Volume 4, No. 1, 1976, and in his paper "Induction Field Wireless Hearing Aids" to be published in the "Proceedings of the Sixth International Deaf-Blind Seminar", held in Australia in 1976.

Range control can be effected by various methods. For example, a given field strength can be sensed by a trigger circuit operated from an AGC circuit control voltage, or, following rectification, from the RF level, the IF level, or the demodulated signal after high-pass filtering. (The last method, or alternatively the detection of beats in the RF signal, may also be used to squelch wireless reception when the receiver is insufficiently within the capture zone of a transmitter.)

The receiver used in the systems described above can, with advantage, be replaced with a radio or infra-red receiver in certain situations. Radio hearing aids could be used where there is no interference problem and where their long range features would be useful—for example, in agriculture. Infra-red telephony, useful only in indoor situations, may be adopted with advantage where electronic eavesdropping could be otherwise practiced—for example, by deaf executives in the course of their office business.

I claim:

1. An induction field communication system which utilizes a modulation format enabling selection between similar electromagnetic signals by capture effect, said system comprising:
   a. transmitting means for transmitting signals in said format and including an induction field generating aerial and microphone circuit, said transmitting means being equipped with an audio automatic gain control in its microphone circuit, said transmitting means having first and second transmitting modes,
   b. a signal receiver for receiving signals in said format and having an induction field receiving aerial, said receiver being sufficiently within the induction field directly generated by said field generating aerial to cause signals from said transmitting means to capture said receiver to the exclusion of other similar signals received by said receiving aerial, and
   c. control means for switching the transmitting means from said first transmitting mode to said second transmitting mode, said second transmitting mode being effective to switch the receiver to a different receiving mode.

2. A system as defined in claim 1, in which said receiver includes a received signal field strength sensor, said sensor generating an inhibition signal when the field strength of the received signal exceeds a predetermined value, said inhibition signal being operative to maintain said transmitting means in a non-transmitting mode.

3. A system as defined in claim 1, in which said receiver includes an adjustable sensor of received signal field strength, said sensor generating a signal which maintains said receiver in said different receiving mode when the received signal field strength is less than a predetermined value.

4. A system as defined in claim 1, in which said control means is voice operated.

5. A system as defined in claim 1, in which said transmitting means transmits signals by induction and said receiver receives signals by induction.

6. A system as defined in claim 1, in which the control means is manually operated.

7. A system as defined in claim 6, in which the second transmitting mode is a transmission carrier frequency shifted from the normal transmission carrier frequency of the transmitting means.

8. A system as defined in claim 6, in which the second transmitting mode is a high frequency FM tone.

9. A system as defined in claim 6, in which the second transmitting mode is a non-transmitting mode.

10. A system as defined in claim 6, in which the receiver includes a microphone responsive to ambient sound and said different receiving mode is reception from said receiver microphone.

* * * * *